United States Patent
Anand et al.

(10) Patent No.: US 11,922,441 B2
(45) Date of Patent: Mar. 5, 2024

(54) METHOD AND SYSTEM FOR EVENT PREDICTION USING SPATIO-TEMPORALLY SAMPLED DATA

(71) Applicant: INTUIT INC., Mountain View, CA (US)

(72) Inventors: Prateek Anand, San Diego, CA (US); Qingbo Hu, Burlingame, CA (US); Apurva Swarnakar, San Diego, CA (US)

(73) Assignee: Intuit, Inc., Mountain View, CA (US)

( * ) Notice: Subject to any disclaimer, the term of this patent is extended or adjusted under 35 U.S.C. 154(b) by 0 days.

(21) Appl. No.: 17/710,197

(22) Filed: Mar. 31, 2022

(65) Prior Publication Data

US 2023/0316303 A1 Oct. 5, 2023

(51) Int. Cl.
*G06Q 30/0202* (2023.01)
*G06N 5/022* (2023.01)
*G06N 5/04* (2023.01)

(52) U.S. Cl.
CPC ......... *G06Q 30/0202* (2013.01); *G06N 5/022* (2013.01); *G06N 5/04* (2013.01)

(58) Field of Classification Search
CPC ....... G06Q 30/0202; G06N 5/022; G06N 5/04
See application file for complete search history.

(56) References Cited

U.S. PATENT DOCUMENTS

| | | | | |
|---|---|---|---|---|
| 9,372,898 | B2 * | 6/2016 | Li | G06F 9/542 |
| 11,514,345 | B2 * | 11/2022 | Chereshnev | G06N 20/00 |
| 2018/0276544 | A1 * | 9/2018 | Chakraborty | G06N 5/022 |
| 2019/0156207 | A1 * | 5/2019 | Chen | G06N 3/0445 |
| 2020/0104402 | A1 * | 4/2020 | Burnett | G06F 16/2477 |
| 2020/0257992 | A1 * | 8/2020 | Achin | G06N 20/10 |
| 2020/0356878 | A1 * | 11/2020 | Lakshmipathy | G06N 5/003 |
| 2021/0201394 | A1 * | 7/2021 | Lemanski | G06Q 40/02 |
| 2021/0294617 | A1 * | 9/2021 | Almecija | G06F 3/0482 |

* cited by examiner

*Primary Examiner* — Dylan C White
(74) *Attorney, Agent, or Firm* — Patterson + Sheridan, LLP

(57) ABSTRACT

Certain aspects of the present disclosure provide techniques for training and using predictive models to predict the occurrence of an event within a software application. An example method generally generating a spatially sampled data set for a set of users of a software application. The spatially sampled data set includes, for each respective user of the set of users, an amount of time the user has spent, a number of discrete portions of the software application the user has visited, and an indication of whether the user has completed a defined task. A spatio-temporally sampled data set for users in the spatially sampled data set is generated, including, for each respective user in the spatially sampled data set, a plurality of candidate timestamps. A predictive model is trained based on the spatio-temporally sampled data set.

14 Claims, 6 Drawing Sheets

210

| User ID | Timestamps | Class |
|---|---|---|
| 1 | T1, T4, T7, T9 | 1 |
| 2 | T2, T4, T5 | 0 |
| 3 | T1, T6, T7, T8 | 0 |
| 4 | T1, T3, T7, T9, T11 | 1 |
| 5 | T1, T2, T6, T8 | 0 |

220

| User ID | Max Timestamp | Class |
|---|---|---|
| 1 | T9 | 1 |
| 2 | T5 | 0 |
| 3 | T8 | 0 |
| 4 | T11 | 1 |
| 5 | T8 | 0 |

230

| User ID | Max Timestamp | Screens Visited | Class |
|---|---|---|---|
| 1 | T9 | 12 | 1 |
| 2 | T5 | 27 | 0 |
| 3 | T8 | 14 | 0 |
| 4 | T11 | 27 | 1 |
| 5 | T8 | 25 | 0 |

240

245

| Screens Visited | Count | User IDs |
|---|---|---|
| 0-15 | 2 | 1, 3 |
| 16-30 | 3 | 2, 4, 5 |

250

| User ID | Timestamps | Class |
|---|---|---|
| 1 | T1, T4, T7, T9 | 1 |
| 2 | T2, T4, T5 | 0 |
| 3 | T1, T6, T7, T8 | 0 |
| 4 | T1, T3, T7, T9, T11 | 1 |

310

| User ID | Max Timestamp |
|---|---|
| 1 | T9 |
| 2 | T5 |
| 3 | T8 |
| 4 | T11 |

320

| User ID | Timestamps | Candidate Timestamps |
|---|---|---|
| 1 | T1, T4, T7, T9 | T9, T4, T1 |
| 2 | T2, T4, T5 | T5, T2 |
| 3 | T1, T6, T7, T8 | T8, T1 |
| 4 | T1, T3, T7, T9, T11 | T11, T7, T3, T1 |

330

| User ID | Timestamps | Candidate Timestamps | Final Timestamps | Class |
|---|---|---|---|---|
| 1 | T1, T4, T7, T9 | T9, T4, T1 | T9, T4 | 1 |
| 4 | T1, T3, T7, T9, T11 | T11, T7, T3, T1 | T11, T3 | 1 |
| 2 | T2, T4, T5 | T5, T2 | T5, T2 | 0 |
| 3 | T1, T6, T7, T8 | T8, T1 | T8, T1 | 0 |

FIG. 3

METHOD AND SYSTEM FOR EVENT PREDICTION USING SPATIO-TEMPORALLY SAMPLED DATA

INTRODUCTION

Aspects of the present disclosure generally relate to event prediction in software applications, and more specifically to predicting events using models trained based on spatio-temporally sampled data.

BACKGROUND

Software applications are generally deployed for use by many users for the performance of a specific function. These applications may be deployed, for example, as web applications accessible over a network, such as the Internet or a private network, or as desktop applications that include static components executed from a local device and dynamic components executed from content retrieved from a network location. These applications can include financial applications, such as tax preparation applications, accounting applications, personal or business financial management applications; social media applications; electronic communications applications; and so on. These software applications generally include help functions that users frequently interact with to obtain information about how to perform various tasks within the software application. Some applications may additionally provide execution environments for the use of third-party plugins, extensions, helpers, and other components to add functionality to these applications. These components may be available for users to download or otherwise link to an instance of a software application through an application store.

Usage patterns within a software application may include information that can be used to predict future user activity with respect to the software application. For example, usage patterns of features in the software application may be predictive of various events related to the software application, such as discontinuing use of the software application, changing subscriptions to obtain access to additional features in the software application, connecting external applications to the software application, and the like. In another example, usage patterns of features in the software application may also be predictive of the types of content with which the user may be interested in interacting (e.g., help content, other explanatory information, etc.).

Randomly sampled usage pattern data can be used to train a machine learning model to predict a likelihood that other users will perform some action with respect to a software application, including, for example, discontinuing use of a software application. However, random sampling of data may result in a training data set that over-represents some aspects of the usage pattern data over other aspects of the usage pattern data that may also provide useful information in generating predictions for another user of the software application. Thus, the predictions made by these machine learning models may thus be inaccurate and may cause the software application to perform actions that are not relevant for a given user, which may negatively affect user experience, and which actually drive user abandonment.

Accordingly, techniques are needed to train machine learning models for accurate event prediction.

BRIEF SUMMARY

Certain embodiments provide a computer-implemented method for training a predictive model. An example method generally includes generating a spatially sampled data set for a set of users of a software application. The spatially sampled data set includes, for each respective user of the set of users, an amount of time the user has spent using the software application, a number of discrete portions of the software application the user has visited, and an indication of whether the user has completed a defined task in the software application. A spatio-temporally sampled data set for the selected subset of users is generated. The spatio-temporally sampled data set includes, for each respective user in the spatially sampled data set, a plurality of candidate timestamps bounded by the amount of time the user has spent using the software application. A predictive model for predicting a likelihood that a user will continue using the software application is trained based on the spatio-temporally sampled data set.

Other embodiments provide a computer-implemented method for predicting event occurrence based on a trained predictive model. The method generally includes generating, based on a predictive model using an amount of time a user of a software application has spent using the software application and a number of discrete portions of the software application the user has visited as input, a predictive score corresponding to a likelihood that a user of a software application will continue using the software application. The predictive model generally comprises a model trained based on a spatio-temporally sampled data set from one or more historical users of the software application having balanced data across each of a plurality of bins into which the one or more historical users of the software application are sorted. One or more actions are taken based on the generated predictive score.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 3 illustrates an example of temporally sampling the spatially sampled application usage data for a plurality of users of the software application.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
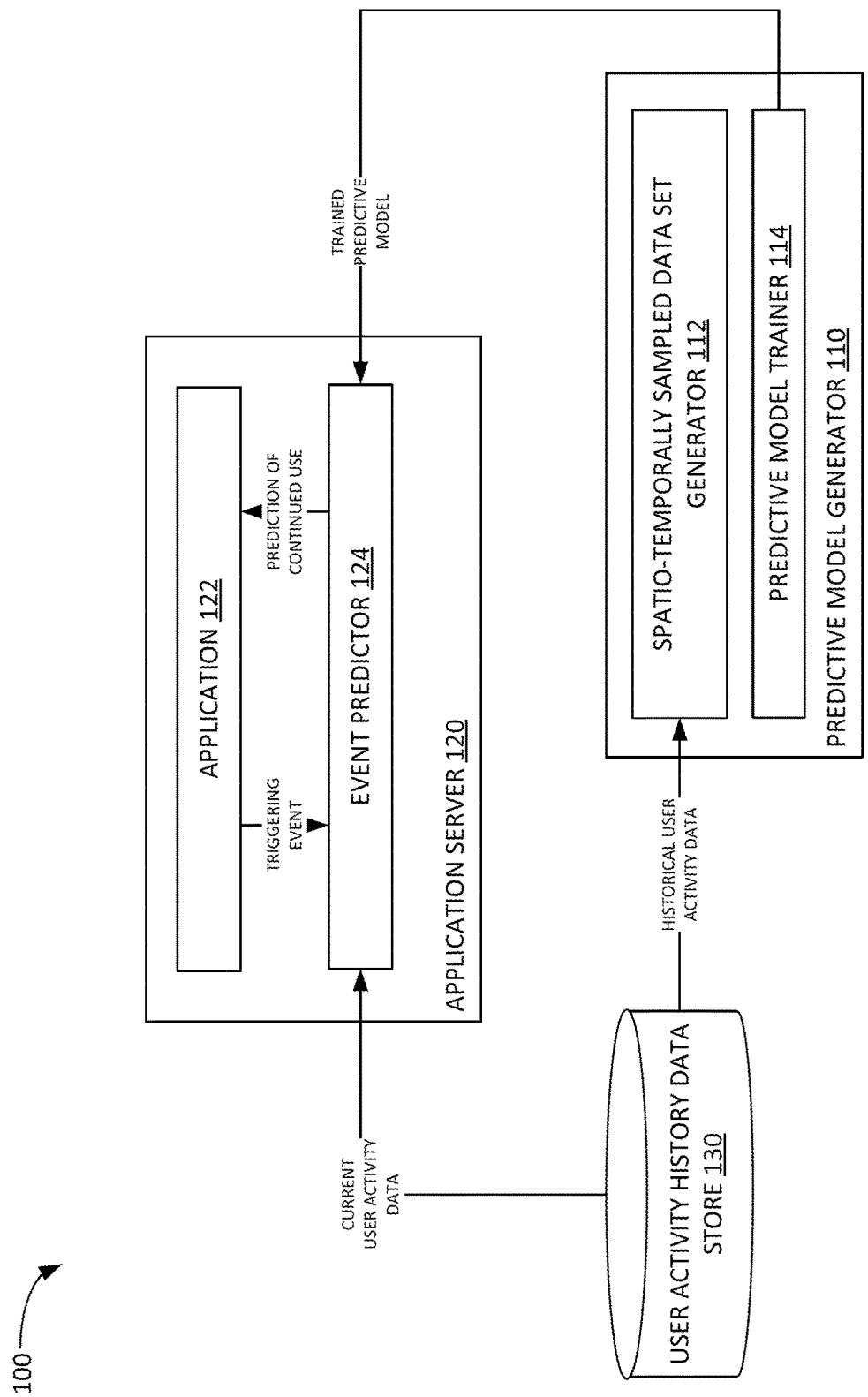
FIG. 1 illustrates a system in which a predictive model is trained and used to predict event occurrence in a software application based on spatio-temporally sampled data.

Aspects of the present disclosure provide apparatuses, methods, processing systems, and computer-readable mediums for predicting a likelihood of an event occurring in a software application using machine learning models trained using spatio-temporally sampled data.

Generally, user activity history of actions performed within a software application is used to train predictive models to predict the likelihood of an event occurring in a software application. The user activity history may generally include information identifying functionality of the software application invoked by the user, a time at which the user invoked the identified functionality, clickstream data identifying actions performed with respect to user interface elements in the software application, and the like. Typically, machine learning models may be trained using sampled data that is intended to be representative of the actions that various users have taken within the software application. For example, usage patterns in a software application can be thought of in terms of a spatial dimension and a temporal dimension. Data in the spatial dimension may be associated with portions of a software application (e.g., screens, routines, features, etc.) with which a user has interacted, and data in the temporal dimension may be associated with different timestamps or other timing information indicative of an amount of time that a user has spent using the software application.

Training machine learning models using sampled data, however, may result in one dimension of data being over-represented at the expense of other dimensions of data. For example, sampling data that has significantly more detail in the temporal dimension than in the spatial dimension may result in a model that over-represents temporal considerations in predicting whether a specific event will occur in the software application for the user. Similarly, sampling data that has significantly more detail in the spatial dimension than in the temporal dimension may result in a model that over-represents spatial considerations in predicting whether a specific event will occur in the software application for the user.

For example, consider a scenario in which training samples are gathered to train a model to predict the likelihood of an event occurring in a software application where users traverse through different screens at different points in time, and the prediction of whether the event will occur can be performed at any time while the user is using the software application. A model that is trained using randomly sampled data from different points in time may not capture a sufficient amount of spatial data to allow the model to accurately predict whether the event will occur. For example, suppose that the predictive model is trained to predict whether a user will complete a task in the software application. Because different users may use different portions of the application and may take different amounts of time to complete a task, and because a randomly selected sample of the amount of time that a user has spent in the application may not be well-correlated to whether the user will complete the task, the predictive model may not accurately predict whether the user will complete the task. Further, other biases in the data, such as over-selection or under-selection of users having specific characteristics (e.g., who complete simplified versions of the task through the application, such as users who prepare simplified tax forms in a tax preparation application instead of more complex tax forms) may cause the model to inaccurately predict whether a user who does not have these specific characteristics will also complete the task in the software application.

Embodiments presented herein provide techniques for training and using predictive models trained based on spatio-temporally sampled data to predict the likelihood of an event occurring with respect to a software application. By spatially sampling historical usage data and temporally sampling the spatially sampled historical usage data to generate a training data set used to train a predictive model, embodiments presented herein provide a balanced set of data across both the spatial and temporal dimensions that can be used to train a predictive model. The resulting model may thus avoid problems that may arise from over-representing data from the spatial dimension or temporal dimension, which enables the model to accurately predict the likelihood of an event occurring in the software application for any user, regardless of the amount of time the user has spent using the application or the number of portions of the application the user has visited. Thus, embodiments of the present disclosure may accurately take various actions based on predictions made by the predictive model, which may minimize processing time, memory usage, network bandwidth usage, and other resource usage that may be wasted by taking irrelevant actions for a user of the software application. Further, users may be presented with information that may provide assistance in using the application, which may allow the user to more quickly complete a task in the application, or allow the user to use the application at a reduced price or access more features on a trial basis to explore the application in more detail before committing to purchasing the application.

Example Training and Using Predictive Models
Trained Based on Spatio-Temporally Sampled Data
to Predict a Likelihood of an Event Occurring with
Respect to a Software Application FIG. 1 illustrates an example computing environment 100 in which a predictive model is trained and used to predict a likelihood of an event occurring with respect to a software application based on spatio-temporally sampled data, and to trigger execution of one or more actions within the software application based on the predicted likelihood of the event occurring. As illustrated, computing environment 100 includes a predictive model generator 110, an application server 120, and a user activity history data store 130.

Predictive model generator 110 is generally representative of one or more physical or virtual computing devices which can generate spatio-temporally sampled training data sets and train a predictive model based on the generated spatio-temporally sampled training data sets. As illustrated, predictive model generator 110 includes a spatio-temporally sampled data set generator 112 and a predictive model trainer 114.

Spatio-temporally sampled data set generator 112 is generally configured to generate a training data set from historical user activity data based on spatial and temporal sampling. As discussed, spatial sampling may allow for data to be sampled across different portions of an application with which a user may interact, and temporal sampling may allow for data to be sampled across different timestamps associated with user action within a software application.

To generate the training data set, spatio-temporally sampled data set generator 112 can retrieve a historical user activity data set from user activity history data store 130. The historical user activity data set retrieved from user activity history data store 130 may include data for each of a plurality of users associated with an indication of whether a specified event has or has not occurred for that user. For example, the indication of whether the specified event has or has not occurred may be a one-bit indicator, a Boolean value, or the like, with one value indicating that the specified event has occurred (e.g., the value 1, Boolean TRUE, etc.) and another value indicating that the specified event has not occurred (e.g., the value 0, Boolean FALSE, etc.). The specified event may include, for example, completion of a specified task using application 122. For example, the specified event may, where application 122 is an application through which a user can prepare and file a tax return, the complete preparation and filing of the tax return.

Each entry in the historical user activity data set retrieved from user activity history data store 130 may include a plurality of timestamps associated with each of a plurality of sections of application 122 with which the user associated with the entry has interacted. For example, the entry associated with a specific user may include a plurality of section-timestamp pairs (e.g., information defining a section of the application the user is using and a time at which the user started interacting with that section of the application) from which spatial and temporal data can be extracted. In another example, each entry in the historical user activity data set may include a plurality of timestamps and a total number of sections of the application with which the user has interacted.

To spatially sample the historical user activity data set from user activity history data store 130, spatio-temporally sampled data set generator 112 can reduce the set of timestamps associated with each respective user of application 122 to a maximum timestamp associated with that user. Generally, the maximum timestamp for a user of application 122 may refer to the latest timestamp for which user activity has been recorded in the historical user activity data set for that user. Further, data about the sections of application 122 with which each user has interacted may be reduced into a total number of unique sections of the application with which the user has interacted. Thus, the historical user activity data set can be transformed into a more compact data set including three data points: the amount of time the user has spent interacting with the application, the user's progress through the application (e.g., represented by the number of unique sections of the application with which the user has interacted), and whether the user has or has not completed a specified task in application 122.

From the simpler data set, a histogram may be constructed based on the number of unique portions of application 122 with which each user in the historical user activity data set has interacted. Spatial bins in the generated histogram may be defined with sizes and ranges selected such that each bin represents a sufficiently different portion of application 122. In some aspects, the size of each spatial bin may also be selected such that each bin includes a specified minimum number of examples from which a training data set can be generated.

The spatially sampled data set may be generated based on the bins defined from the generated histogram. Generally, the number of users to include from each bin in the spatially sampled data set may be the number of users included in the bin with the smallest number of users. All of the users included in the bin with the smallest number of users may be included in the spatially sampled data set. For each of the other bins defined from the generated histogram, users may be randomly selected. By generating the spatially sampled data set based on the number of users included in the bin with the smallest number of users, the spatially sampled data set may be relatively balanced between users that have completed the task in application 122 and users that have not completed the task in application 122. Further, the spatially sampled data set may include data that provides uniform, or near-uniform, spatial coverage across different portions of application 122.

After spatially sampling the historical user activity data set, spatio-temporally sampled data set generator 112 can proceed to temporally sample the spatially sampled data set to generate a training data set based on which a predictive model can be trained. To temporally sample the spatially sampled data set, spatio-temporally sampled data set generator 112 selects the maximum timestamp $t_{max}$ (e.g., the latest timestamp recorded for a user of application 122) from the spatially sampled data set and defines a plurality of temporal windows from which timestamps are to be selected for each user in the spatially sampled data set. Each window may have an interval i of a pre-defined amount of time. Thus, the temporal windows from which timestamps may be selected as candidate timestamps for the spatio-temporally sampled data set may be defined with upper and lower bounds that are a function of $t_{max}$ and i. Generally, each temporal window x may be defined with a lower bound of $t_{max}-xi$ and an upper bound of $t_{max}-(x-1)i$, in which the lower bound is exclusive and the upper bound is inclusive. That is, each temporal window x may be defined as timestamps between the range $(t_{max}-xi, t_{max}-(x-1)i]$. The number of temporal windows generated by spatio-temporally sampled data set generator 112 may be based on the maximum timestamp $t_{max}$ and the interval i such that no temporal window includes both a negative upper bound timestamp and a negative lower bound timestamp relative to a defined zero value, which may be, for example, a defined earliest time such as a release date or initial use date for application 122.

For each user in the spatially sampled data set, spatio-temporally sampled data set generator 112 examines the timestamps associated with the user to determine which timestamps are to be selected as candidate timestamps for inclusion in spatio-temporally sampled training data set. If a timestamp exists within a temporal window x, spatio-temporally sampled data set generator 112 can include that timestamp in the set of candidate timestamps. If multiple timestamps exist within the temporal window x, spatio-temporally sampled data set generator 112 can randomly select one of these multiple timestamps to temporally sample the spatially sampled data set. For example, suppose that within a temporal window x, a user is associated with timestamps 1, 2, and 3. To temporally sample the data within this temporal window, one of timestamps 1, 2, or 3 may be included in the spatio-temporally sampled training data set so that the data included in a temporal window includes only a single data point from each user if the user has a timestamp within the temporal window.

After selecting a set of candidate timestamps for each user in the spatially sampled data set, the resulting data set may include an unbalanced number of timestamps. That is, some users in the spatially sampled data set may have a larger number of candidate timestamps than other users, which may result in a data set that is unbalanced. Thus, to generate a balanced, spatio-temporally sampled data set, the set of candidate timestamps may be reduced to a number corresponding to the smallest number of candidate timestamps associated with a specific user in the spatio-temporally sampled data set. For example, suppose that a first user has four candidate timestamps, a second user has three candidate timestamps, and a third user has two candidate timestamps. The timestamps included in the spatio-temporally sampled data set may be reduced to two timestamps for each user in the spatio-temporally sampled data set. Thus, the timestamps included for the first user can be reduced from four timestamps to two timestamps, and the timestamps included for the second user can be reduced from three timestamps to two timestamps. The timestamps selected for each user from the set of candidate timestamps may be randomly selected so that the spatio-temporally sampled data set includes a balanced data set for both users who have completed a task and users who have not completed the task in the application and includes data representing uniform, or at least similar (e.g., having a number of data points that is within some defined threshold value), temporal coverage across different paths that users can take in order to complete the task in the application.

Predictive model trainer 114 generally uses the spatio-temporally sampled data set generated by spatio-temporally sampled data set generator 112 to train a predictive model to predict a likelihood that a user will perform some specific action with respect to application 122. This action may include, for example, a decision to discontinue use of application 122, continue use of application 122, subscribe to a different version of application 122 to gain access to additional features or downgrade to a simpler version of application 122, or the like. Generally, the predictive model may be trained to take, as input, a timestamp and a spatial data point from application 122 (e.g., corresponding to a portion of application 122 with which a user is currently interacting, an amount of application 122 with which the user has interacted up to the time associated with the timestamp, etc.), and output a score corresponding to a likelihood that the user will perform a specific action with respect to the application. The score may be, for example, a score between 0 and 1, where a 0 value indicates that a user has a high likelihood of performing the specific action with respect to the application and a 1 value indicates that a user as a low likelihood that the user will perform the specific action with respect to the application (or vice versa). For example, where the action is to continue use of application 122, a 0 value may indicate a high likelihood that the user will not continue to use application 122 (e.g., will abandon use of application 122), while a 1 value may indicate a high likelihood that the user will continue to use application 122.

In some aspects, the predictive model trained by predictive model trainer 114 may be a gradient boosting model, such as an XGBoost model. In training a gradient boosting model, a predictive model trainer 114 generates a plurality of decision trees based on residual values calculated for each of a plurality of training data sets derived, directly or indirectly, from the spatio-temporally sampled data set. Generally, in a gradient boosting model, each decision tree may be a tree that classifies an input based on a single variable and a single split value assigned to that variable. As trees are added in the gradient boosting model, the loss, or difference between a prediction made by the gradient boosting model and a ground truth value in the training data set, may decrease. Each successive tree may be fit based on a derivative of a loss function with respect to an output of a previous tree (or set of trees) until some defined number of decision trees are generated.

In some aspects, the predictive model trained by predictive model trainer 114 may be a neural network that is trained to output a probability distribution over a binary choice of options for a given set of inputs. The neural network may include, for example, deep neural networks, or other neural networks that can generate a probability distribution predicting a likely output value for a given set of inputs.

After training the event prediction model, predictive model trainer 114 can deploy the trained event prediction model to event predictor 124 for use in predicting a likelihood of various events occurring for a user of application 122 and triggering actions to be performed based on the predicted likelihood, as discussed in further detail below.

Application server 120 is generally representative of one or more physical or virtual computing devices on which an application may be executed. Generally, application server 120 hosts an application 122 and an event predictor 124. Application 122 may be any type of application in which users can execute functions provided by the application and request content related to the application (e.g., help content, third-party applications or plugins that interact with the application, etc.) during execution of the functions provided by the application. As users interact with application 122, log data related to user activity within application 122 may be committed to user activity history data store 130 for further training of the event prediction model and to predict the occurrence that a given event will occur (e.g., that a user will discontinue use of application 122, etc.), as discussed in further detail below.

Various events within application 122 can be used as a trigger for generating a predictive score corresponding to a likelihood that a specified event will happen within application 122 for the user. In one example, a user request to terminate a session in the software application may trigger the generation of a predictive score. In other examples, the events used as triggers may include requests to invoke a help session with the software application, requests to invoke specified types of help sessions within the software application (e.g., a request to invoke help sessions in application 122 through a chatbot or with a live support agent), requests to transition from one portion of the application to another portion of the application, and so on. When a defined trigger event occurs in application 122, application 122 can request that event predictor generate a predictive score for the user of application 122.

Event predictor 124 uses user activity data for a user of application 122 and the predictive model trained by predictive model trainer 114 to predict a likelihood that a given event will occur for the user. To predict the likelihood that the event will occur for the user, event predictor 124 may input information about the amount of time the user has spent using the application (or other timestamp data from which the amount of time the user has spent using application can be derived) and information about the amount of the application with which the user has interacted into the predictive model. The predictive model may then, in turn, generate a predictive score corresponding to a likelihood that a specific event will occur for the user of application 122. The specific event may, in some aspects, be the user discontinuing use of application 122; however, it should be recognized that the techniques described herein may be used to predict the likelihood of any of a variety of events occurring within application 122 for a given user of application 122.

Event predictor 124 may then return the probability score to application 122, where the probability score is used to identify one or more actions to take to make it more likely or less like that the event will occur. For example, when event predictor 124 is used to predict a likelihood that a user will unlock additional features in application 122, the actions taken may be those defined within application 122 as likely to make it more likely that the user will unlock those additional features. Similarly, when event predictor 124 is used to predict a likelihood that a user will discontinue use of application 122 (also referred to as "abandoning" the application), application 122 can take various actions to minimize the risk that the user will actually discontinue use of application 122. The action(s) taken by application 122 may be based on the event that triggered generation of the predictive score, a location in the application in which the event occurred, and the like.

For example, if a user requested termination of a session in the application upon reaching a portion of the application in which payment details were presented and/or requested, application 122 may be configured to take various actions to attempt to retain the user of the application. For example, application 122 can generate an offer for the user to continue using the application at a reduced price, allow the user to continue using the application (e.g., on a trial basis), defer requests for payment until the user reaches another portion of the application, and so on. Application 122 can further generate various alerts or screens indicating to the user that payment is deferred and that the user can continue using the application.

In another example, various pieces of contextual information can be used to determine an action to be taken to minimize the risk that the user will actually discontinue use of application 122. For example, information such as an amount of time that a user has spent on a particular portion of the application, an amount of help content the user has read, and other similar information can be used, in conjunction with the predictive score, to determine an action to take in response to an occurrence of one of the defined trigger events in application 122. If a user has spent up to a threshold amount of time working on a specific portion of the application without interacting with help content, the application 122 can recommend or otherwise present one or more articles related to the specific portion of the application to aid the user in using the software application. If a user has spent more than the threshold amount of time working on the specific portion of the application and has interacted with help content without making progress, application 122 can determine that a support session with a live agent or a support session with an automated agent (e.g., a chatbot) may be effective in presenting the user from discontinuing use of the application. Thus, application 122 can prompt the user to initiate a support session with one or both of an automated agent or a live agent.

In some aspects, application 122 may initiate a support session with an automated agent and transition to a support session with a live agent if the automated agent is unable to solve the user's problems using application 122. The determination of whether to initiate a support session with an automated agent or a live agent may, for example, be based on the predictive score generated by event predictor for the user. In such a case, likelihoods that the user will discontinue use of the software application exceeding a threshold value may trigger initiation of a support session with a live agent, while likelihoods below the threshold value may trigger initiation of a support session with an automated agent.

Example Spatio-Temporal Sampling of User Activity Data

Figure 2:
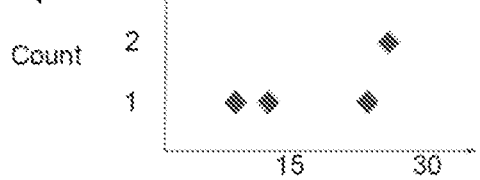
FIG. 2 illustrates an example of spatially sampling application usage data for a plurality of users of a software application.

FIG. 2 illustrates an example of spatially sampling application usage data for a plurality of users of a software application.

As illustrated, a raw data set 210 may begin with a plurality of timestamps recorded for each user and a class assigned to each user. In an example in which a model is trained to predict whether a user will discontinue use of an application, the classification assigned to each user may be a binary classification which a 0 value indicates that the user has not completed a task in the application and a 1 value indicates that the user has completed the task in the application. The timestamps may indicate, for example, when a user has interacted with specific portions of the application. These specific portions of the application may, for example, be associated with progress through the application, such as beginning specified steps within a workflow exposed by the application, completing specified steps within the workflow, or the like.

To spatially sample the data in raw data set 210, data set 220 may be generated by reducing the set of timestamps in the raw data set 210 to a maximum timestamp for each user of the application. The maximum timestamp generally is the latest timestamp for which activity is recorded for a specific user of the application 122 and may correspond to the amount of time that specific user has spent working within the application.

Data set 230 generally adds information about each user's progress through the application to data set 220. As illustrated, progress through the application may be represented by a number of distinct screens that a user has visited within the application. Because each distinct screen represents a different portion of the application, using the number of distinct screens the user has visited may provide a more accurate indicator of progress through the application than the total number of screens the user has visited, as the total number of screens the user has visited may include repeated screens that do not represent progress through the application.

A histogram 240 may be generated based on data set 230 to illustrate a distribution of the number of unique portions of the application each user in data set 230 has visited. As illustrated, histogram 240 illustrates that two users have visited 15 or fewer screens in the application, and three users have visited 16 or more screens in the application. Binned data 245 may be generated based on the data in data set 230 and a defined bin size identified from histogram 240. As illustrated, the raw data set 210 may be divided into two bins: a first bin for users who have visited between zero and fifteen unique screens, and a second bin for users who have visited between sixteen and thirty unique screens. Two users may be included in the first bin (i.e., users 1 and 3), and three users may be included in the second bin (i.e., users 2, 4, and 5). The binned data 245 may be used to generate the spatially sampled data set such that each bin includes the same number of entries. As discussed, the number of entries may be defined based on the number of users in the bin with the smallest number of users. That is, in this example, because the smallest bin in binned data 245 includes two users, the resulting spatially sampled data set 250 may include two users from the first bin and two users from the second bin. To select the two users from the second bin, the users in this bin (e.g., users 2, 4, and 5 as illustrated in raw data set 210) may be randomly selected. As a result, in this example, the spatially sampled data set 250 may include data for users 1 and 3 from the first bin and data for users 2 and 4 from the second bin (though, it should be recognized that selecting users 2 and 5 or users 4 and 5 from the second bin may also be valid selections for the spatially sampled data set 250).

FIG. 3 illustrates an example of temporally sampling the spatially sampled application usage data for a plurality of users of the software application.

As illustrated, to temporally sample the spatially sampled application usage data (e.g., spatially sampled data set 250 illustrated in FIG. 2), data set 310 may be generated to identify the maximum timestamp for each user in the spatially sampled data set 250. In this example, the maximum timestamp for user 1 is T9, the maximum timestamp for user 2 is T5, the maximum timestamp for user 3 is T8, and the maximum timestamp for user 4 is T11.

Assuming that the defined interval is 3, a plurality of timestamp windows may be defined with a lower bound of $t_{max}-xi$ and an upper bound of $t_{max}-(x-1)i$, where x represents the $x^{th}$ window. For user 4 in the spatially sampled data set 250, and for x=1, thus, the upper bound may be defined as 11−(1−1)*3=11−0*3=11, and the lower bound may be defined as 11−1*3=11−3=8, and thus the first timestamp window may be defined as (8, 11]. Similarly user 4 and for x=2, the upper bound may be defined as 11−(2−1)*3=11−1*3=8, the lower bound may be defined as 11−2*3=11−6=5, and the resulting second timestamp window may be defined as (5, 8]. This computation proceeds until the lower bound is calculated as a negative number, as it may be assumed that a negative timestamp would be invalid for the application since a negative timestamp would represent a time prior to when a user began using the application and/or prior to when the application was released for use. In this example, the timestamp windows for user 4 may thus be defined as (8, 11], (5, 8], (2, 5], and (−1, 2]. Similarly, the timestamp windows for user 1 may be defined as (6, 9], (3, 6], and (0, 3]; the timestamp windows for user 2 may be defined as (2, 5] and (−1, 2]; and the timestamp windows for user 3 may be defined as (5, 8], (2, 5], and (−1, 2].

To temporally sample the spatially sampled data set 250, and generate a candidate data set 320, candidate timestamps may be selected for each user in spatially sampled data set 250 based on the defined timestamp windows for that user. Generally, candidate timestamps may be selected for each defined timestamp window, unless no data exists for any value with in a specific timestamp window. As illustrated, user 1 includes two timestamps in the range (6, 9], one timestamp in the range (3, 6], and one timestamp in the range (0, 3]. To temporally sample the data for this user, a single timestamp may be selected for each range for which a user has data. Thus, the set of candidate timestamps for user 1 may include one of timestamps T7 or T9 (but not both) to represent the range (6, 9], timestamp T4 to represent the range (3, 6], and timestamp T1 to represent the range (0, 3]. Similarly, candidate timestamps for user 2 may include one of timestamps T4 or T5 to represent the range (2, 5] and timestamp T2 to represent the range (−1, 2]; candidate timestamps for user 3 may include one of timestamps T6, T7, or T8 to represent the range (5, 8], no timestamp to represent the range (2, 5] because no data exists within this timestamp window, and timestamp T1 to represent the range (−1, 2]; and candidate timestamps for user 4 may include one of timestamps T11 or T9 to represent the range (8, 11], timestamp T7 to represent the range (5, 8], timestamp T3 to represent the range (2, 5], and timestamps T1 to represent the range (−1, 2].

Finally, candidate data set 320 may be balanced to form spatio-temporally sampled data set 330. To balance candidate data set 320, the number of timestamps included for each user in the candidate data set 320 may be equalized (e.g., to the minimum number of candidate timestamps included for any user in the candidate data set 320). Because the minimum number of candidate timestamps in candidate data set 320 is two (e.g., for users 2 and 3), the candidate timestamps for the other users in candidate data set 320 may also be reduced to two. To reduce the number of timestamps for each user, timestamps may be randomly selected. As illustrated, thus, spatio-temporally sampled data set 330 may include timestamps T9 and T4 for user 1, timestamps T5 and T2 for user 2, timestamps T8 and T1 for user 3, and timestamps T11 and T3 for user 4 (though, it should be recognized that other selections of timestamps may result from a random selection of the candidate timestamps selected for each user in the spatially sampled data set 250).

The resulting spatio-temporally sampled data set 330 may, as illustrated, include a balanced set of data including similar numbers of users who have completed a task in the software application and who have not completed the task in the software application. Further, because these users are spatially sampled (as discussed above), the spatio-temporally sampled data set 330 may include similar amounts of information across different spaces within the software application so that the spatio-temporally sampled data set fairly represents the diversity of spaces and times over which different users can use the software application.

Figure 4:
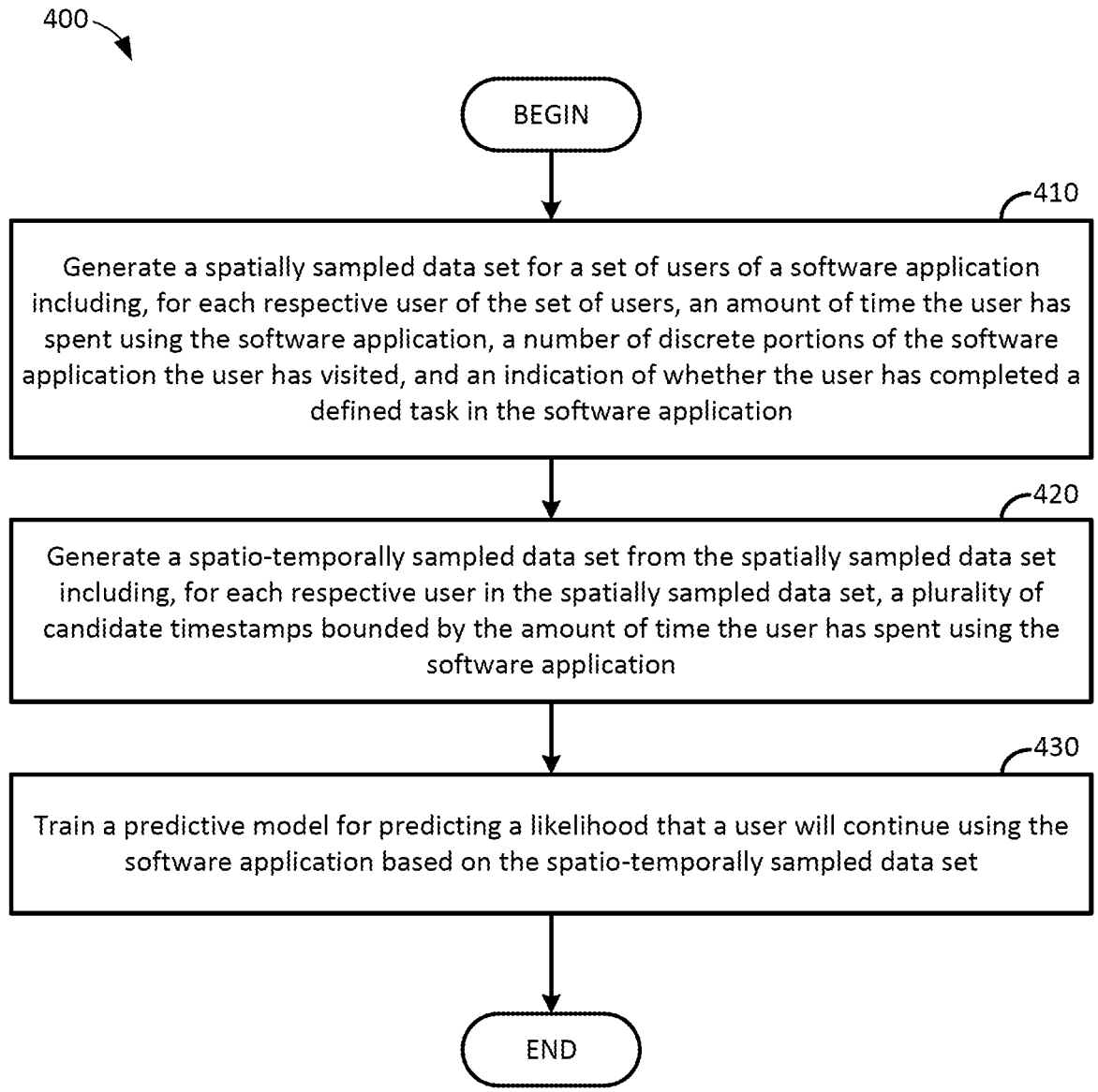
FIG. 4 illustrates example operations for training a predictive model to predict event occurrence in a software application based on spatio-temporally sampled data.

Example Computer-Implemented Method for Training a Predictive Model Using Spatio-Temporally Sampled Historical User Activity Data FIG. 4 illustrates example operations 400 for training a predictive model to predict event occurrence in a software application based on a spatio-temporally sampled data set of historical user activity data. The operations described herein may be performed, for example, by a spatio-temporally sampled data set generator and predictive model trainer executing on a computing environment in a computing environment (e.g., by spatio-temporally sampled data set generator 112 and predictive model trainer 114 of predictive model generator 110, as illustrated in FIG. 1).

As illustrated, operations 400 begin at block 410 with generating a spatially sampled data set for a set of users of a software application. Generally, the spatially sampled data set includes, for each respective user of the set of users, an amount of time the user has spent using the software application, a number of discrete portions of the software application the user has visited, and an indication of whether the user has completed a defined task in the software application.

In some aspects, to generate the spatially sampled data set, the set of users of the software application may be divided into a plurality of bins. Each bin may correspond to a unique range of numbers of discrete portions of the software application visited by users in the bin. The discrete portions of the software application may include, for example, unique screens in the software application. The spatially sampled data set may be generated by selecting all users from the bin having the smallest number of users and by selecting a subset of users in each of the plurality of bins other than the bin having the smallest number of users. The subset of users may be randomly selected such that each bin includes a number of users equal to the number of users in the bin having the smallest number of users.

At block 420, operations 400 proceed with generating a spatio-temporally sampled data set from the spatially sampled data set. The spatio-temporally sampled data set includes, for each respective user in the spatially sampled data set, a plurality of candidate timestamps, bounded by the amount of time the user has spent using the software application.

In some aspects, to generate the spatio-temporally sampled data set, a maximum timestamp may be identified for each user of the plurality of users in the spatially sampled data set. The maximum timestamp generally indicates a longest amount of time a user has used the software application. For each respective user in the selected subset of users, candidate timestamps are selected for each window in the plurality of windows. Each window may be defined based on the maximum timestamp for the user and a multiple of the defined interval. Generally, the candidate timestamps may include a number of randomly selected timestamps from a set of timestamps derived from the maximum timestamp and multiples of the defined interval, and the number of the candidate timestamps may be the same for each respective user in the selected subset of users.

At block 430, operations 400 proceed with training a predictive model for predicting a likelihood that a user will continue using the software application. The predictive model may be trained based on the spatio-temporally sampled data set. The predictive model may be, for example, a gradient boosting model or a neural network. After training the predictive model, the predictive model may be deployed (e.g., to an application server or other computing system on which predictions of whether a specified event will occur within an application for a user of the application can be made).

Figure 5:
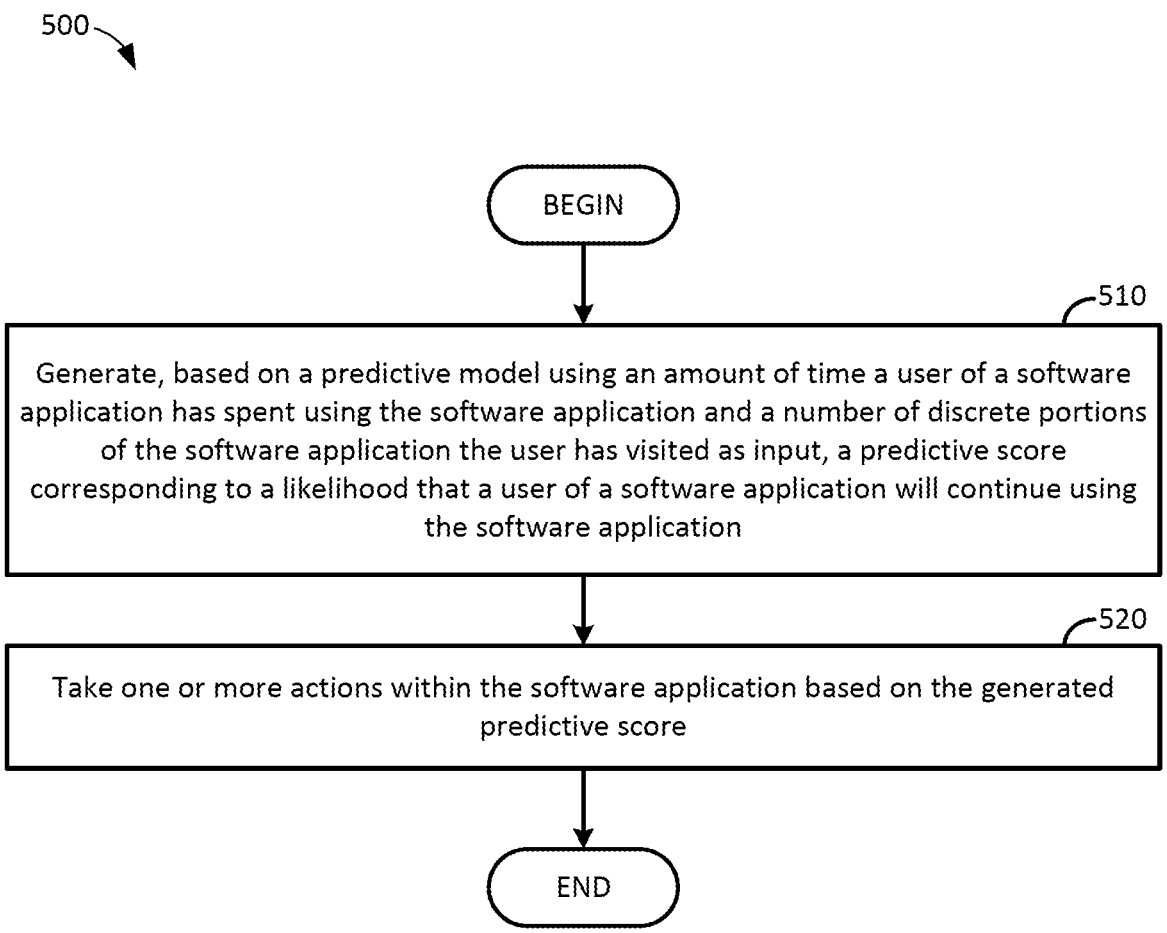
FIG. 5 illustrates example operations for predicting event occurrence in a software application using a predictive model trained based on spatio-temporally sampled data.

Example Computer-Implemented Method for Predicting Event Occurrence in a Software Application Using a Predictive Model Trained Based on Spatio-Temporally Sampled Data FIG. 5 illustrates example operations 500 for predicting event occurrence in a software application using a predictive model trained using a spatio-temporally sampled data set. The operations described herein may be performed, for example, by an application and an event predictor (e.g., by application 122 and event predictor 124 executing on application server 120, as illustrated in FIG. 1).

Operations 500 may begin at block 510, with generating, based on a predictive model, a predictive score corresponding to a likelihood that a user of a software application will continue using the software application. The predictive model may use an amount of time a user of the software application has spent using the software application and a number of discrete portions of the software application the user has visited as input. In some aspects, the predictive model may be a model trained based on a spatio-temporally sampled data set from one or more historical users of the software application having balanced data across each of a plurality of bins into which the one or more historical users of the software application are sorted.

In some aspects, generation of the predictive score may be triggered by the occurrence of a defined event within the software application. The defined event may include, for example, a request to terminate a session in the software application, a request to invoke a help session within the software application, a request to transition from a first portion of the software application to a second portion of the software application, and the like. Generally, the predictive score may be generated in real-time, or in near-real-time, so that one or more actions may be taken at the time, or near the time, at which a triggering event occurs in the software application.

At block 520, operations 500 proceed with taking one or more actions within the software application based on the generated predictive score. Generally, the one or more actions may be actions that are taken when the predictive score indicates that a user is likely to abandon use of the application to reduce the likelihood that the user will actually abandon use of the application. For example, the one or more actions may include generating an offer to a user to continue using the software application at a reduced prices. In some aspects, the actions may include various actions to aid the user in using the application, or a specific portion of the application in which the user may be experiencing problems. For example, the actions may include presenting one or more articles related to a portion of the software application that the user is using to aid the user in using the software application or prompting the user to start a support session with one or more of a live agent or an automated agent. As discussed, in some aspects, the choice of action may be based on a likelihood that the user will abandon use of the application and other contextual information that may render some actions more suitable than other actions in reducing the likelihood that the user will abandon use of the application.

Figure 6:
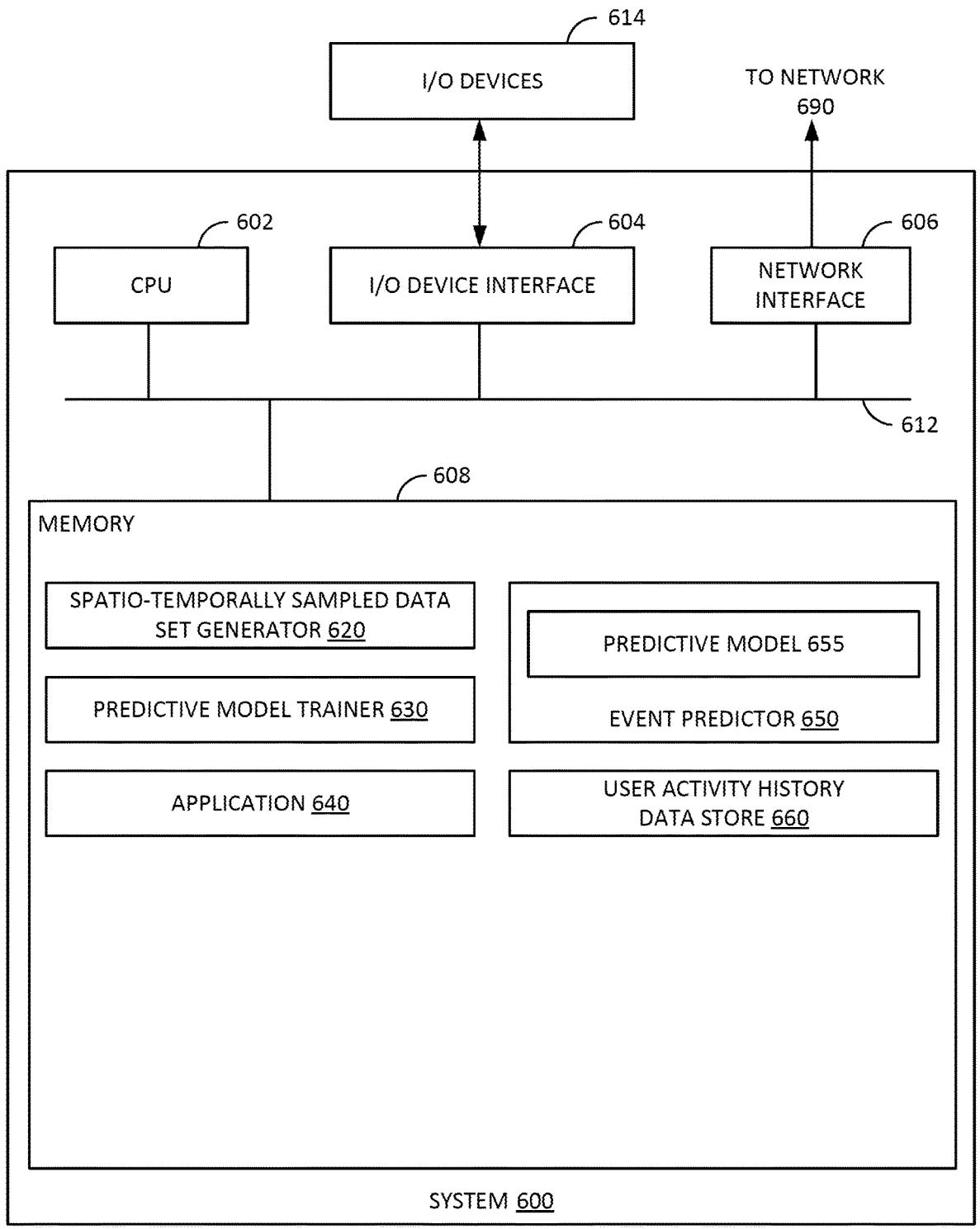
FIG. 6 illustrates an example computing system with which embodiments of the present disclosure may be implemented.

Example System for Training and Using Predictive Models Trained Using Spatio-Temporally Sampled Data to Predict a Likelihood of an Event Occurring with Respect to a Software Application FIG. 6 illustrates an example system 600 that trains and uses predictive models to predict a likelihood of an event occurring with respect to a software application based on spatio-temporally sampled data. In one example, system 600 may comprise predictive model generator 110 and application server 120 illustrated in FIG. 1.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606 through which system 600 is connected to network 690 (which may be a local network, an intranet, the internet, or any other group of computing devices communicatively connected to each other), a memory 608, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 604, and memory 608.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random access memory, or the like. As shown, memory 608 includes a spatio-temporally sampled data set generator 620, a predictive model trainer 630, an application 640, an event predictor 650, and a user activity history data store 660.

Spatio-temporally sampled data set generator 620 may correspond to spatio-temporally sampled data set generator 112 illustrated in FIG. 1. Generally, spatio-temporally sampled data set generator 620 spatially samples a historical data set of user activity from application 640 (e.g., stored in and retrieved from user activity history data store 660, which may correspond to user activity history data store 130 illustrated in FIG. 1) to generate a spatially sampled data set, then temporally samples the spatially sampled data set to generate a spatio-temporally sampled data set. As discussed, the spatio-temporally sampled data set may generally include a balanced set of data including similar numbers of users who have completed a task in the software application and who have not completed the task in the software application and may include similar amounts of information across different spaces within the software application so that the spatio-temporally sampled data set fairly represents the diversity of spaces and times over which different users can use the software application.

Predictive model trainer 630 may correspond to predictive model trainer 114 illustrated in FIG. 1. Generally, predictive model trainer 630 trains predictive model 655 used by event predictor 650 based on the spatio-temporally sampled data set generated by spatio-temporally sampled data set generator 620. The predictive model may be, for example, a gradient boosting model, a neural network, or other machine learning model that can predict the likelihood of an event occurring.

Application 640 may correspond to application 122 illustrated in FIG. 1. Generally, application 640 may allow for users to initiate sessions within the application, and user activity within the application may be recorded, committed to user activity history data store 660, and used by an event prediction model to predict a likelihood of an event occurring with respect to application 640. When specified triggering events occur within application 640, application 640 can request a predictive score from event predictor 650 and use the predictive score to determine one or more actions to perform to increase or decrease the likelihood that the event will occur for the user. For example, these actions may include actions to decrease the likelihood that a user will abandon use of the application 640 or actions to increase the likelihood that user will upgrade their subscription to application 640 to access additional features that the upgraded version of application 640 provides.

Event predictor 650 may correspond to event predictor 124 illustrated in FIG. 1. Generally, event predictor 650 uses a predictive model 655 trained by predictive model trainer 630 using a spatio-temporally sampled data set to predict the likelihood that a specified event with respect to application 640 will occur. To predict the likelihood that the event will occur, event predictor 650 can retrieve user activity history from user activity history data store 660 and extract a latest timestamp and a number of unique portions of application 640 the user has visited from the retrieved user activity history. The latest timestamp and the number of unique portions of application 640 visited by the user may be input into predictive model 655, which may generate a predicted likelihood that a specified event will occur within application 640 for the user.

Example Clauses

Clause 1: A method, comprising: generating a spatially sampled data set for a set of users of a software application including, for each respective user of the set of users, an amount of time the user has spent using the software application, a number of discrete portions of the software application the user has visited, and an indication of whether the user has completed a defined task in the software application; generating a spatio-temporally sampled data set from the spatially sampled data set including, for each respective user in the spatially sampled data set, a plurality of candidate timestamps bounded by the amount of time the user has spent using the software application; and training a predictive model for predicting a likelihood that a user will continue using the software application based on the spatio-temporally sampled data set.

Clause 2: The method of Clause 1, wherein generating the spatially sampled data set comprises: dividing the set of users of the software application into a plurality of bins, each bin corresponding to a unique range of numbers of discrete portions of the software application visited by users in the bin; selecting all users from a bin of the plurality of bins having a smallest number of users; and selecting a subset of users for each of the plurality of bins other than the bin having the smallest number of users.

Clause 3: The method of Clause 2, wherein selecting the subset of users for each of the plurality of bins comprises randomly selecting a number of users corresponding to a number of users in the bin having a smallest number of users.

Clause 4: The method of any one of Clauses 2 or 3, wherein each bin of the plurality of bins corresponds to a unique portion of the software application.

Clause 5: The method of any one of Clauses 1 through 4, wherein generating the spatio-temporally sampled data set comprises: identifying, from users in the spatially sampled data set, a maximum timestamp indicating a longest amount of time a user in the spatially sampled data set has used the software application; and selecting, for each respective user in the spatially sampled data set, candidate timestamps in each window of a plurality of windows, each window being defined based on the maximum timestamp and a multiple of a defined interval.

Clause 6: The method of Clause 5, wherein the candidate timestamps comprise a number of randomly selected timestamps from a set of timestamps derived from the maximum timestamp and multiples of the defined interval.

Clause 7: The method of any one of Clauses 5 or 6, wherein a number of the candidate timestamps is the same for each respective user in the spatially sampled data set.

Clause 8: The method of any one of Clauses 1 through 7, wherein the predictive model comprises a gradient boosting model.

Clause 9: The method of any one of Clauses 1 through 8, wherein the predictive model comprises a neural network.

Clause 10: The method of any one of Clauses 1 through 9, further comprising deploying the predictive model.

Clause 11: A method, comprising: generating, based on a predictive model using an amount of time a user of a software application has spent using the software application and a number of discrete portions of the software application the user has visited as input, a predictive score corresponding to a likelihood that a user of a software application will continue using the software application, wherein the predictive model comprises a model trained based on a spatio-temporally sampled data set from one or more historical users of the software application having balanced data across each of a plurality of bins into which the one or more historical users of the software application are sorted; and taking one or more actions based on the generated predictive score.

Clause 12: The method of Clause 11, wherein generating the predictive score is triggered by an occurrence of a defined event within the software application.

Clause 13: The method of Clause 12, wherein the defined event comprises a request to terminate a session in the software application.

Clause 14: The method of any one of Clauses 12 or 13, wherein the defined event comprises a request to invoke a help session within the software application.

Clause 15: The method of any one of Clauses 12 through 14, wherein the defined event comprises a request to transition from a first portion of the software application to a second portion of the software application.

Clause 16: The method of any one of Clauses 11 through 15, wherein taking the one or more actions comprises generating an offer to continue using the software application at a reduced price.

Clause 17: The method of any one of Clauses 11 through 16, wherein taking the one or more actions comprises presenting one or more articles related to a portion of the software application that the user is using to aid the user in using the software application.

Clause 18: The method of any one of Clauses 11 through 17, wherein taking the one or more actions comprises prompting the user to start a support session with one or more of a live agent or an automated agent.

Clause 19: An apparatus comprising: a memory having executable instructions stored thereon; and a processor configured to execute the executable instructions to cause the apparatus to perform the operations of any one of Clauses 1 through 18.

Clause 20: An apparatus comprising: means for performing the operations of any one of Clauses 1 through 18.

Clause 21: A computer-readable medium having instructions stored thereon which, when executed by a processor, performs the operations of any one of Clauses 1 through 18.

ADDITIONAL CONSIDERATIONS

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    generating a spatially sampled data set for a set of users of a software application including, for each respective user of the set of users, an amount of time the respective user has spent using the software application, a number of discrete portions of the software application the respective user has visited, and an indication of whether the respective user has completed a defined task in the software application, wherein:
        generating the spatially sampled data set comprises:
            dividing the set of users of the software application into a plurality of bins, each bin corresponding to a unique range of numbers of discrete portions of the software application visited by users in the bin;
            selecting all users from a bin of the plurality of bins having a smallest number of users; and
            selecting a subset of users for each of the plurality of bins other than the bin having the smallest number of users, and
        the spatially sampled data set comprises a data set smaller than a historical activity data set from which the spatially sampled data set is generated, the historical data set including a spatial dimension corresponding to discrete portions of the software application and a temporal dimension corresponding to times at which interaction with the software application occurred;
    generating a spatio-temporally sampled data set from the spatially sampled data set including, for each respective user in the spatially sampled data set, a plurality of candidate timestamps bounded by the amount of time the respective user has spent using the software application, wherein generating the spatio-temporally sampled data set comprises:
        identifying, from users in the spatially sampled data set, a maximum timestamp indicating a longest amount of time a user in the spatially sampled data set has used the software application; and
        selecting, for each respective user in the spatially sampled data set, candidate timestamps in each window of a plurality of windows, each window being defined based on the maximum timestamp and a multiple of a defined interval;
    training a predictive model for predicting a likelihood that a user will continue using the software application based on the spatio-temporally sampled data set given an input of a timestamp and a spatial data point within the software application, wherein training the predictive model comprises training a gradient boosting model including a plurality of decision trees generated based on residual values calculated from the spatio-temporally sampled data set and a split value assigned to each respective residual value calculated from the spatio-temporally sampled data set, wherein:
        the trained predictive model is used to generate a predictive score based on respective spatio-temporally sampled data; and
        the generated predictive score is used to perform one or more of:
            routing the user to a support session with a live agent, or
            routing the user to an automated support session; and further training the predictive model based on additional log data related to user activity within the software application after the generating of the predictive score.

2. The method of claim 1, wherein selecting the subset of users for each of the plurality of bins comprises randomly selecting a number of users corresponding to a number of users in the bin having a smallest number of users.

3. The method of claim 1, wherein each bin of the plurality of bins corresponds to a unique portion of the software application.

4. The method of claim 1, wherein the candidate timestamps comprise a number of randomly selected timestamps from a set of timestamps derived from the maximum timestamp and multiples of the defined interval.

5. The method of claim 1, wherein a number of the candidate timestamps is the same for each respective user in the spatially sampled data set.

6. The method of claim 1, further comprising deploying the predictive model.

7. A method, comprising:
generating, based on a predictive model using an amount of time a user of a software application has spent using the software application and a number of discrete portions of the software application the user has visited as input, a predictive score corresponding to a likelihood that a user of a software application will continue using the software application, wherein:
the predictive model comprises a model trained based on a spatio-temporally sampled data set from one or more historical users of the software application having balanced data across each of a plurality of bins into which the one or more historical users of the software application are sorted,
the spatio-temporally sampled data set comprises a data set sampled from a spatial dimension corresponding to different portions of the software application and a temporal dimension corresponding to times at which interaction with the software application occurred, and
the predictive model comprises a gradient boosting model including a plurality of decision trees having been generated based on residual values calculated from the spatio-temporally sampled data set and a split value assigned to each respective residual value calculated from the spatio-temporally sampled data set;
performing, based on the generated predictive score, one or more of:
routing the user to a support session with a live agent, routing the user to an automated support session, or displaying content that is selected based on the generated predictive score; and
receiving additional log data related to user activity within the software application after the generating of the predictive score, wherein the additional log data is used to further train the predictive model.

8. The method of claim 7, wherein generating the predictive score is triggered by an occurrence of a defined event within the software application.

9. The method of claim 8, wherein the defined event comprises a request to terminate a session in the software application.

10. The method of claim 8, wherein the defined event comprises a request to invoke a help session within the software application.

11. The method of claim 8, wherein the defined event comprises a request to transition from a first portion of the software application to a second portion of the software application.

12. The method of claim 7, wherein the content that is displayed comprises an offer to continue using the software application at a reduced price.

13. The method of claim 7, wherein the content that is displayed comprises one or more articles related to a portion of the software application that the user is using to aid the user in using the software application.

14. A system, comprising:
a memory having executable instructions stored thereon; and
a processor configured to execute the executable instructions to cause the system to:
generate a spatially sampled data set for a set of users of a software application including, for each respective user of the set of users, an amount of time the respective user has spent using the software application, a number of discrete portions of the software application the respective user has visited, and an indication of whether the respective user has completed a defined task in the software application, wherein:
in order to generate the spatially sampled data set, the processor is configured to cause the system to:
divide the set of users of the software application into a plurality of bins, each bin corresponding to a unique range of numbers of discrete portions of the software application visited by users in the bin;
select all users from a bin of the plurality of bins having a smallest number of users; and
select a subset of users for each of the plurality of bins other than the bin having the smallest number of users, and
the spatially sampled data set comprises a data set smaller than a historical activity data set from which the spatially sampled data set is generated, the historical data set including a spatial dimension corresponding to discrete portions of the software application and a temporal dimension corresponding to times at which interaction with the software application occurred;
generate a spatio-temporally sampled data set from the spatially sampled data set including, for each respective user in the spatially sampled data set, a plurality of candidate timestamps bounded by the amount of time the respective user has spent using the software application, wherein in order to generate the spatio-temporally sampled data set, the processor is configured to cause the system to:
identify, from users in the spatially sampled data set, a maximum timestamp indicating a longest amount of time a user in the spatially sampled data set has used the software application; and
select, for each respective user in the spatially sampled data set, candidate timestamps in each window of a plurality of windows, each window being defined based on the maximum timestamp and a multiple of a defined interval;
train a predictive model for predicting a likelihood that a user will continue using the software application based on the spatio-temporally sampled data set given an input of a timestamp and a spatial data point within the software application, wherein in order to train the predictive model, the processor is configured to cause the system to train a gradient boosting model including a plurality of decision trees generated based on residual values calculated from the spatio-temporally sampled data set and a split value assigned to each respective residual value calculated from the spatio-temporally sampled data set, wherein:
the trained predictive model is used to generate a predictive score based on respective spatio-temporally sampled data; and
the generated predictive score is used to perform one or more of:
routing the user to a support session with a live agent, or
routing the user to an automated support session; and
further train the predictive model based on additional log data related to user activity within the software application after the generating of the predictive score.

* * * * *